United States Patent
Hunter et al.

(10) Patent No.: US 8,133,057 B2
(45) Date of Patent: Mar. 13, 2012

(54) METHOD AND SYSTEM FOR PROVIDING TRAINING MEDIA TO A MOBILE DEVICE

(75) Inventors: William F. Hunter, Denver, CO (US);
Jeffrey S. Demoff, Littleton, CO (US);
Alan S. Wolff, Louisville, CO (US)

(73) Assignee: Oracle America, Inc., Redwood City, CA (US)

( * ) Notice: Subject to any disclaimer, the term of this patent is extended or adjusted under 35 U.S.C. 154(b) by 1443 days.

(21) Appl. No.: 11/478,988

(22) Filed: Jun. 30, 2006

(65) Prior Publication Data
US 2008/0003557 A1    Jan. 3, 2008

(51) Int. Cl.
*G09B 19/00*    (2006.01)
(52) U.S. Cl. ........................ 434/219; 434/308; 434/350
(58) Field of Classification Search .................. 434/219, 434/350, 308; 705/26.1–27.2
See application file for complete search history.

(56) References Cited

U.S. PATENT DOCUMENTS

| | | | | |
|---|---|---|---|---|
| 5,306,154 | A | * | 4/1994 | Ujita et al. ..................... 434/218 |
| 5,730,604 | A | * | 3/1998 | Jay et al. ........................ 434/365 |
| 5,741,135 | A | * | 4/1998 | Bennett .......................... 434/118 |
| 5,823,781 | A | * | 10/1998 | Hitchcock et al. ............. 434/118 |
| 6,021,119 | A | * | 2/2000 | Derks et al. .................... 370/261 |
| 6,032,141 | A | * | 2/2000 | O'Connor et al. .............. 706/45 |
| 6,438,579 | B1 | * | 8/2002 | Hosken .......................... 709/203 |
| 7,809,601 | B2 | * | 10/2010 | Shaya et al. ................... 705/7.31 |
| 2003/0073065 | A1 | * | 4/2003 | Riggs ............................. 434/350 |
| 2005/0203931 | A1 | * | 9/2005 | Pingree et al. ................ 707/100 |
| 2006/0127871 | A1 | * | 6/2006 | Grayson ........................ 434/350 |
| 2007/0269787 | A1 | * | 11/2007 | Cronstrom .................... 434/350 |

* cited by examiner

Primary Examiner — Kang Hu
(74) Attorney, Agent, or Firm — Osha • Liang LLP

(57) ABSTRACT

A method for providing training media to a mobile device involves obtaining a training media file selected from multiple training media files, based on user metadata, and communicating the training media file to the mobile device, where the user metadata is associated with a user of the mobile device, and where the training media file includes training information associated with a job function of the user.

18 Claims, 3 Drawing Sheets

METHOD AND SYSTEM FOR PROVIDING TRAINING MEDIA TO A MOBILE DEVICE

BACKGROUND

In many businesses, one or more employees may be required to travel frequently, or may be based at a location other than a main office. For example, salespeople are frequently distributed across one or more geographic areas. Similarly, client representatives, consultants, contractors, and educators may be required to spend extended periods of time away from a main office. Such employees are generally said to be working "in the field," and are referred to, hereinafter, as field employees.

In some cases, a business may wish to provide training for its field employees. For example, training on specific topics may be required by compliance regulations (e.g., Sarbanes-Oxley). As another example, the business may wish to train salespeople in the field on new or improved products. Those skilled in the art will appreciate that many different types of training exist, e.g., safety training, managerial training, technical training, human resources training, etc.

To provide training for field employees, a business may arrange to bring field employees and training personnel together at a single location, such as a main office or a location leased specifically for training purposes. Alternatively, the business may provide a web site interface for viewing training materials. In the latter case, the training materials are typically viewed directly within the web site interface.

SUMMARY

In general, in one aspect, the invention relates to a method for providing training media to a mobile device, comprising obtaining a first training media file selected from a plurality of training media files, based on user metadata, and communicating the first training media file to the mobile device, wherein the user metadata is associated with a user of the mobile device, and wherein the first training media file comprises training information associated with a job function of the user.

In general, in one aspect, the invention relates to a system for providing training media to a mobile device, comprising user metadata associated with a user of the mobile device, a plurality of training media files, wherein a training media file selected from the plurality of training media files comprises training information associated with a job function of the user, and a content server configured to obtain the user metadata, obtain the training media file, based on the user metadata, and communicate the training media file to the mobile device.

In general, in one aspect, the invention relates to a computer readable medium comprising executable instructions for providing training media to a mobile device by obtaining a training media file selected from a plurality of training media files, based on user metadata, and communicating the training media file to the mobile device, wherein the user metadata is associated with a user of the mobile device, and wherein the training media file comprises training information associated with a job function of the user.

Other aspects of the invention will be apparent from the following description and the appended claims.

DETAILED DESCRIPTION

Figure 1:
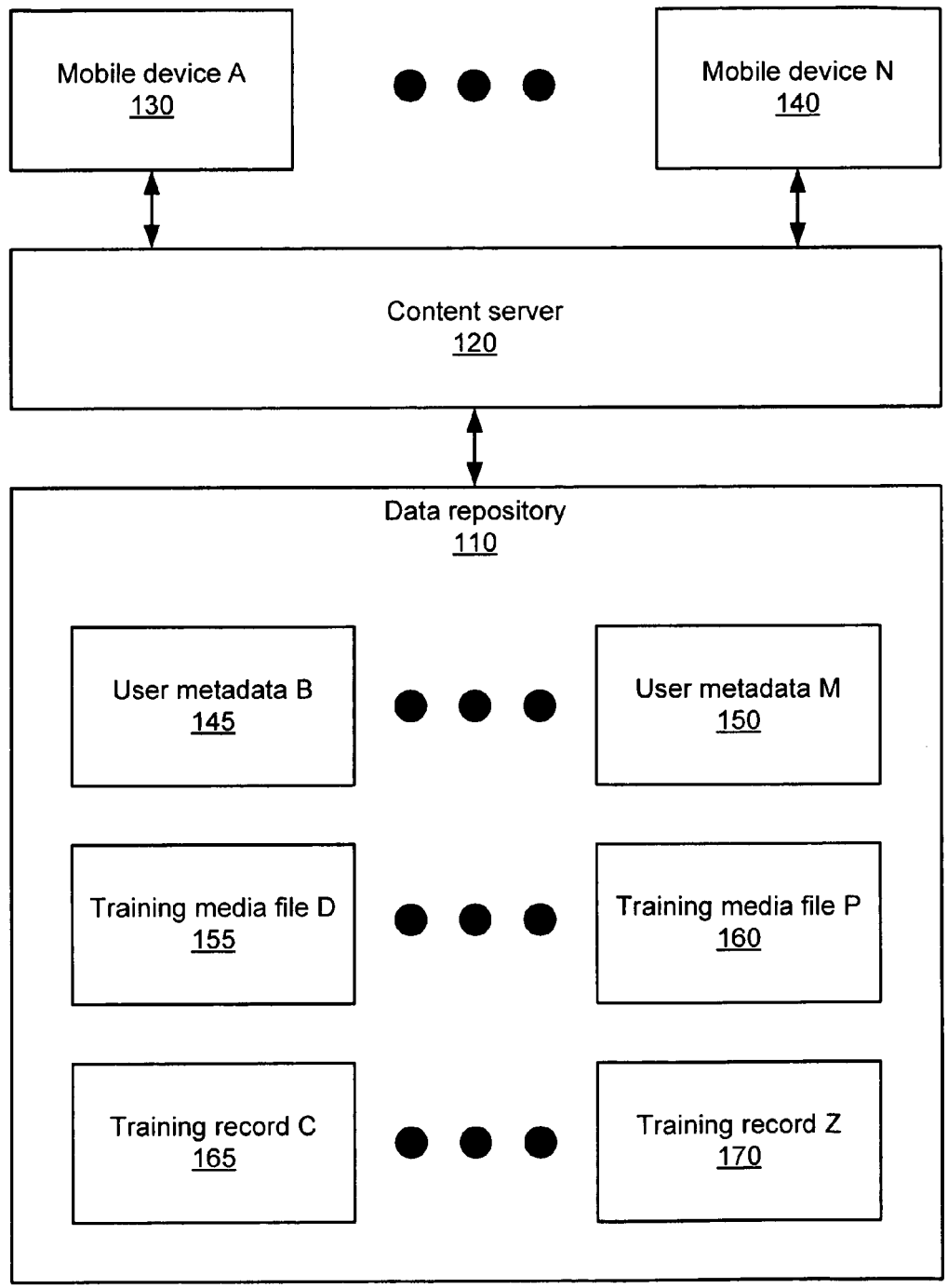
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for providing training media to a mobile device. In one or more embodiments of the invention, a user of the mobile device is associated with user metadata, e.g., the user's job title, industry, product focus, etc. From multiple training media files, a training media file is obtained based on the user metadata. Specifically, the training media file obtained is associated with the job function of the user. The training media file is then communicated to the mobile device.

FIG. 1 shows a diagram of a system in accordance with one or more embodiments of the invention. Specifically, the system includes a data repository (110), a content server (120), and one or more mobile devices (e.g., mobile device A (130), mobile device N (140)), in accordance with one or more embodiments of the invention.

In one or more embodiments of the invention, each of the mobile devices (e.g., 130, 140) may be associated with a particular user (not shown). For example, one or more of the users may be field employees. The mobile devices (e.g., 130, 140) may be portable audio devices (e.g., MPEG-1 layer 3 (MP3) players), laptop computers, personal digital assistants (PDAs), portable video devices, any other type of mobile device, or any combination thereof. For example, one of the mobile devices (e.g., 130, 140) may be an MP3 player, while another of the mobile devices (e.g., 130, 140) may be a portable video device. Further, one or more of the mobile devices (e.g., 130, 140) may be configured for mobile networking, e.g., using cellular networking, Bluetooth, Wi-Fi, 802.11, or any other type of mobile networking technology.

In one or more embodiments of the invention, using mobile devices (e.g., 130, 140) may reduce or eliminate the need to arrange in-person training sessions, thereby saving time and/or money for the business and its employees. Further, mobile devices (e.g., 130, 140) may allow for training to occur at a time and/or place that is convenient for the field employee, thereby increasing the likelihood that the training is performed. Further, if the mobile devices (e.g., 130, 140) are mobile networking devices, then users may be able to access training as soon as the need or desire for the training arises.

Continuing with discussion of FIG. 1, in one or more embodiments of the invention, the data repository (110) is configured to store user metadata (e.g., user metadata B (145), user metadata M (150)) associated with users of the mobile devices (e.g., 130, 140), training media files (e.g., training media file D (155), training media file P (160)), and/or training records (e.g., training record C (165), training record Z (170)) associated with the users and the training media files (e.g., 155, 160). The data repository (110) may be a database, a table in a database, a row in a database table, a memory cache, a hierarchical file system, or any other type of repository for storing user metadata (e.g., 145, 150), training media files (e.g., 155, 160), and/or training records (e.g., 165, 170).

In one or more embodiments of the invention, the user metadata (e.g., 145, 150) may include different types of information associated with the user. For example, the user metadata (e.g., 145, 150) may include a user's job title, industry, security level, sales organization, product focus, job level, client name(s), and/or geographical location. As another example, the user metadata (e.g., 145, 150) may include user feedback (e.g., a rating) associated with the training media files (e.g., 155, 160), or any other type of information associated with the user and the training media files (e.g., 155, 160). Many different types of user metadata (e.g., 145, 150) exist.

In one or more embodiments of the invention, the training media files (e.g., 155, 160) may include video data, audio data, textual data, any other type of data, or any combination thereof. For example, the training media files (e.g., 155, 160) may include product documentation, video presentations, audio lectures, or any other type of media providing training benefit. Further, one or more of the training media files (e.g., 155, 160) may be interactive, i.e., supporting user interaction via a user interface of a mobile device (e.g., 130, 140). For example, a training media file (e.g., 155, 160) may include interactive testing, multiple training paths selected based on interactive user input, voice recognition capability, or any other type of interactive feature.

In one or more embodiments of the invention, the training records (e.g., 165, 170) may include information about which training media files (e.g., 155, 160) users have accessed and/or completed viewing. Storing training records (e.g., 165, 170) may allow for effective auditing of training completion for users, analysis of training trends, etc. Possible uses of training records (e.g., 165, 170) are discussed in detail below, with respect to FIG. 2.

In one or more embodiments of the invention, a single data repository (110) may be used. Alternatively, multiple data repositories (e.g., 110) may be used. For example, a first data repository (e.g., 110) may be configured to store training media files (e.g., 155, 160), a second data repository (e.g., 110) may be configured to store user metadata (e.g., 145, 150), and a third data repository (e.g., 110) may be configured to store training records (e.g., 165, 170). Further, each type of data may be distributed across multiple data repositories (e.g., 110). For example, one data repository (e.g., 110) may be configured to store user metadata (e.g., 145, 150) associated with one group of users, while another data repository (e.g., 110) may be configured to store user metadata (e.g., 145, 150) associated with another group of users. Depending on the implementation of the system, many different combinations of data repositories (e.g., 110) may be used.

In one or more embodiments of the invention, the content server (120) is configured to obtain a training media file (e.g., 155, 160) from the data repository (110) and communicate the training media file (e.g., 155, 160) to a mobile device (e.g., 130, 140). Specifically, the content server (120) is configured to obtain the training media file (e.g., 155, 160) based on user metadata (e.g., 145, 150) stored in the data repository (110) and associated with the user of the mobile device (e.g., 130, 140) to which the training media file (e.g., 155, 160) is communicated. The content server (120) may be a web server, a cellular service provider, or any other type of device, or combination of devices, configured to communicate a training media file (e.g., 155, 160) to a mobile device (e.g., 130, 140).

Further, the content server (120) may include functionality for authorizing users, managing subscriptions associated with the training media files (e.g., 155, 160), generating training records (e.g., 165, 170), analyzing training records (e.g., 165, 170), obtaining tracking completion signals associated with the training media files (e.g., 155, 160), updating the user metadata (e.g., 145, 150), tracking user ratings of training media files (e.g., 155, 160), performing search queries generated by users, and/or supporting interactive features of training media files (e.g., 155, 160). These and other possible functionalities of the content server (120) are discussed in detail below.

In one or more embodiments of the invention, a single content server (120) may be used. Alternatively, multiple content servers (e.g., 120) may be used. For example, different content servers (e.g., 120) may exist for each geographic area in which field employees are located. Further, each content server (e.g., 120) may be configured to perform one or more unique functions associated with the system. For example, one content server (e.g., 120) may be configured to manage subscriptions, and another content server (e.g., 120) may be configured to authorize access to training media files (e.g., 155, 160). In one or more embodiments of the invention, using multiple content servers (e.g., 120) may improve performance characteristics of the system. For example, geographical distribution of content servers (e.g., 120) may improve communication performance between the content servers (e.g., 120) and the mobile devices (e.g., 130, 140). Further, multiple content servers (e.g., 120) may be synchronized with each other to provide consistent content across the content servers (e.g., 120).

Figure 2:
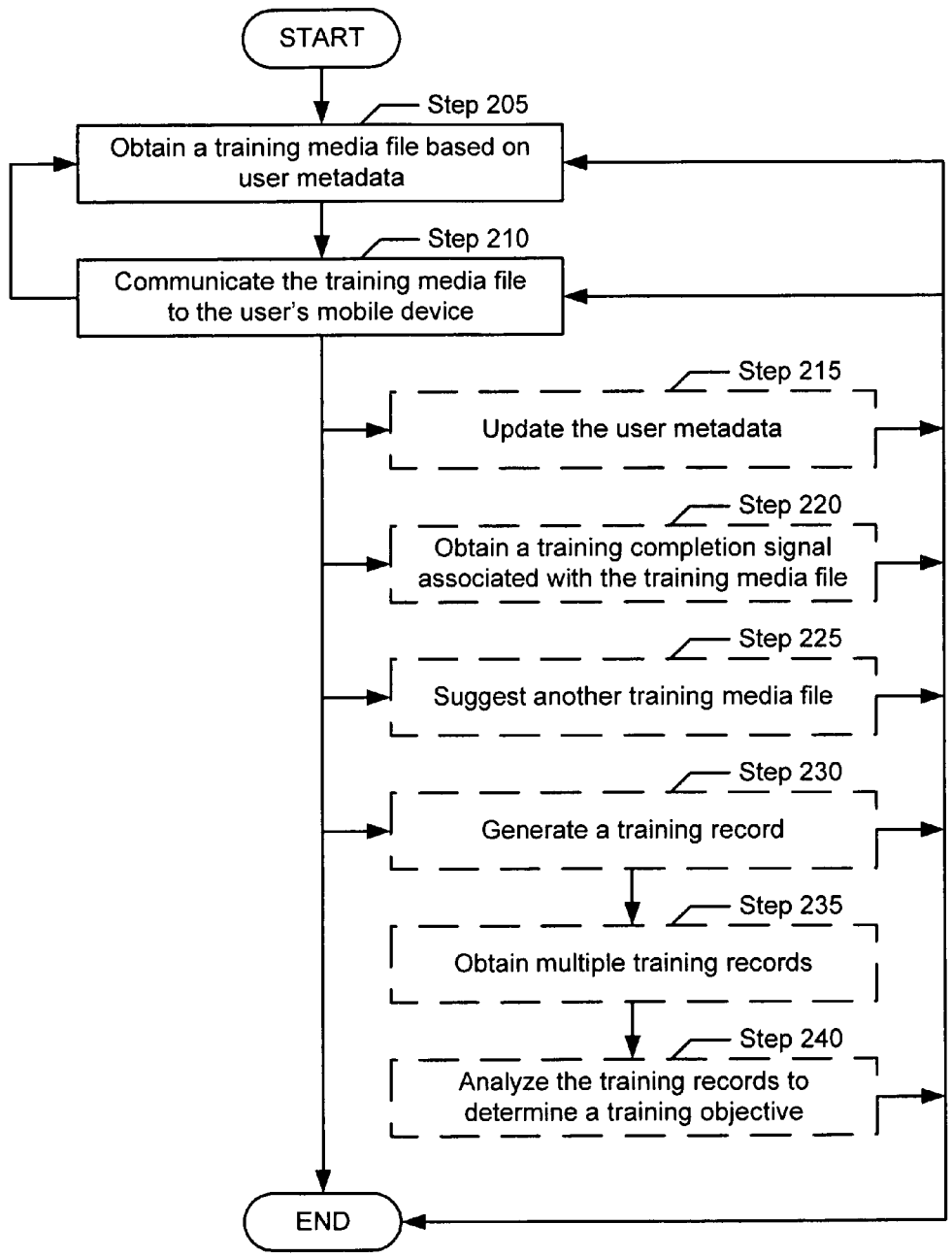
FIG. 2 shows a flowchart in accordance with one or more embodiments of the invention.

As discussed above, mobile devices may communicate with a content server to obtain one or more training media files. FIG. 2 shows a flowchart in accordance with one or more embodiments of the invention. Specifically, FIG. 2 shows a flowchart of a method for providing training media to a mobile device, in accordance with one or more embodiments of the invention.

Initially, a training media file is obtained based on user metadata (Step 205). The training media file may be obtained in many different ways. For example, a list of training media files may be presented to the user, and the user may then select one of the training media files. Further, a content server may obtain the training media file by analyzing the user metadata to determine a training media file to obtain, e.g., based the user's job title. In addition, the training media file may be part of a subscription associated with the user. For example, the user may be subscribed (e.g., via a really simple syndication (RSS) feed) to a specific category of training media files, and the training media file obtained may be a new and/or previously unviewed training media file.

In one or more embodiments of the invention, obtaining the training media file based on the user metadata (i.e., Step 205) may provide for targeted training. In other words, the training media file obtained may relate specifically to an aspect of the user's job function. Thus, the use of user metadata in this manner may provide for more efficient training, which may result in time and/or financial savings for the business and the user.

Continuing with discussion of FIG. 2, the obtained training media file is subsequently communicated to the user's mobile device (Step 210). For example, if the mobile device is a mobile networking device, then the training media file may be communicated over a network (e.g., the Internet). Further, the training media file may be "streamed." In other words, viewing of the training media file may begin on the mobile device even as the training media file is being communicated over the network. Alternatively, the training media file may be first communicated to a separate device, such as a desktop computer, and subsequently transferred from the separate device to the mobile device. Many different ways to communicate a training media file to a mobile device exist, each of which may be used in one or more embodiments of the invention.

In the following discussion, performing Steps 215-240, separately or in combination, may be optional. Specifically, in one or more embodiments of the invention, the method may end after performing Step 210. Alternatively, Step 205 may be repeated, or one or more of Steps 215-240 may be performed. Further, on completion of one or more of the aforementioned steps, one or more of Steps 205-240 may be repeated. In other words, in one or more embodiments of the invention, one or more of the steps may be performed any number of times.

In one or more embodiments of the invention, in Step 215, the user metadata may be updated. For example, the user may have provided feedback in response to viewing the training media file. As another example, the user metadata may simply be updated to indicate that the user has accessed the training media file. In the latter case, such user metadata may be stored separately from any training records, if training records are used, or training records may be used as user metadata. Updating the user metadata may allow for improved selection of training media files that are targeted at the user's specific training requirements and/or interests.

In one or more embodiments of the invention, in Step 220, a training completion signal associated with the training media file may be obtained. For example, the training media file may include programmatic markers configured to indicate that specific portions of the training media file have been viewed, and these markers may be used to generate the training completion signal. Accordingly, the mobile device may be configured to communicate the training media signal, e.g., in a network packet, to a content server for storage and/or analysis. Such training completion signals may be useful, for example, in cases where certain types of training are mandatory, especially if an audit trail is required for the training (e.g., for compliance-related training).

In one or more embodiments of the invention, in Step 225, another training media file may be suggested for the user to view. For example, a training media file having similar subject matter as the most recently obtained training media file may be suggested. Further, if the user metadata includes ratings of training media files, then the ratings may be used to determine a training media file to suggest, based, for example, on ratings obtained from other users. For example, if the most recently viewed training media file was "file A" and a user has rated both "file A" and "file B" highly, then "file B" may be suggested. Alternatively, the training media file suggested may simply be the next training media file in a predetermined training sequence. Many different ways to determine a training media file to suggest exist, any of which may be used in one or more embodiments of the invention. Suggesting a training media file in this manner may allow for filtering of the training media files based on user-determined quality, relevance, etc. Further, such suggestions may expose a user to a training media file that he or she might not have otherwise thought to view.

In one or more embodiments of the invention, in Step 230, a training record is generated. For example, if Step 220 is performed, then the training record may be generated based on obtaining the training completion signal. Alternatively, the training record may simply indicate that a training media file has been identified in a search query, communicated to a mobile device, or any other factor associated with searching, obtaining, communicating, rating, suggesting, and/or viewing the training media file.

After at least one training record is generated, multiple training records may be obtained (Step 235). Collectively, the training records obtained may represent a history of training media files that have been searched, obtained, communicated, rated, suggested, and/or viewed. The training records may then be analyzed (Step 240). Specifically, the training records may be analyzed to determine a training objective. For example, if a particular training media file has been viewed frequently, then the training objective may involve creating a new training media file directed to similar subject matter as the frequently viewed media file. Alternatively, if a particular training media file has not been viewed frequently, then the training objective may involve requiring mandatory viewing of the training media file. Further, the training media objective may involve requiring mandatory viewing of a related training media file, eliminating the training media file (i.e., removing and/or disabling the training media file so that the training media file can no longer be communicated to mobile devices), eliminating all training media files directed to similar subject matter, or any other type of training objective.

In one or more embodiments of the invention, the method of FIG. 2, discussed above, provides an efficient, timely, targeted, and/or cost-effective means for providing training media to a mobile device. Further, the use of training media files in conjunction with mobile devices may provide training options and/or flexibility that might not otherwise be available to users such as field employees.

Figure 3:
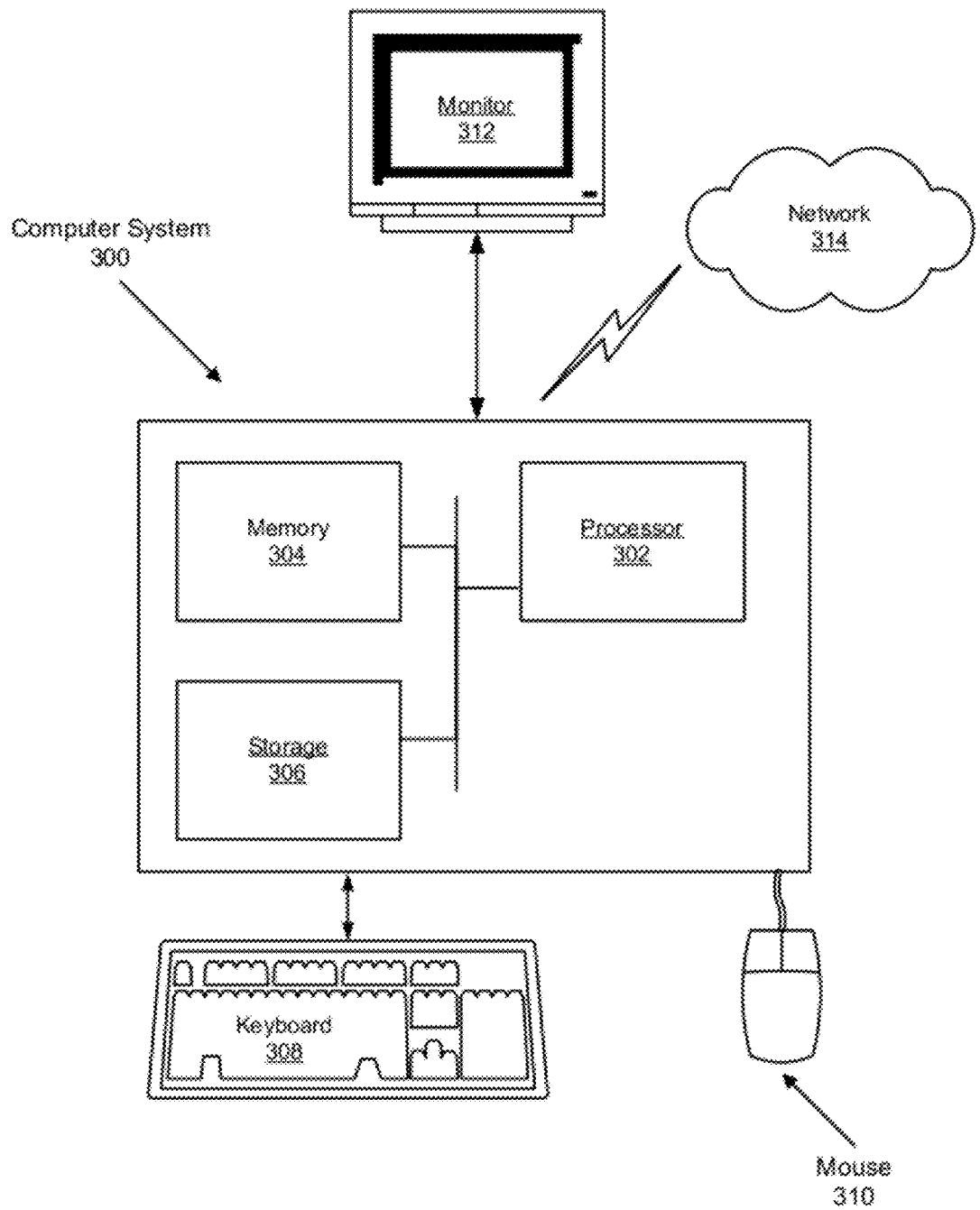
FIG. 3 shows a diagram of a computer system in accordance with one embodiment of the invention.

The invention may be implemented on virtually any type of computer regardless of the platform being used. For example, as shown in FIG. 3, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) may be connected to a network (314) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, the invention may be implemented on a distributed system having a plurality of nodes, where each portion of the invention (e.g., mobile device, content server, data repository, user metadata, training media file, training record, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a non-transitory computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising executable instructions, which when executed by a processor perform a method for providing training media to a mobile device, the method comprising:
   obtaining, by a content server, a first training media file for a first user, wherein the first training media file comprises training information associated with a job function of the user, and wherein the first training media file is selected from a plurality of training media files based on user metadata associated with the first user;
   communicating, by the content server, the first training media file to the mobile device;
   receiving, by the content server, a training completion signal associated with the first training media file, wherein the training completion signal is generated by the mobile device based on a complete viewing of the first training media file;
   based on receiving the training completion signal:
      determining, by the content server, a second user associated with a first user rating for the first training media file;
      determining, by the content server, a second training media file from the plurality of training media files, wherein the second user is associated with a second user rating for the second training media file, and wherein the second user rating is at least as high as the first user rating; and
   suggesting, by the content server, the second training media file to the first user.

2. The non-transitory computer readable medium of claim 1, wherein the first training media file comprises a programmatic marker configured to indicate to the mobile device that the first training media file has been completely viewed.

3. The non-transitory computer readable medium of claim 1, the method further comprising executable instructions for:
   updating, by the content server, the user metadata, based on one selected from the group consisting of obtaining the first training media file and communicating the first training media file to the mobile device.

4. The non-transitory computer readable medium of claim 1, the method further comprising executable instructions for:
   generating, by the content server, a training record associated with the first user and the first training media file;
   obtaining, by the content server, a plurality of training records, wherein the plurality of training records comprises the training record; and
   analyzing, by the content server, the plurality of training records to determine a training objective.

5. The non-transitory computer readable medium of claim 4, wherein the training objective comprises at least one selected from a group consisting of requiring mandatory viewing of the first training media file, requiring mandatory viewing of a second training media file, creating a second training media file directed to similar subject matter as the first training media file, eliminating the first training media file, and eliminating all training media files directed to similar subject matter as the first training media file.

6. The non-transitory computer readable medium of claim 1, wherein obtaining the first training media file is performed based on a training media subscription associated with the first user.

7. The non-transitory computer readable medium of claim 6, wherein the training media subscription comprises a really simple syndication (RSS) feed.

8. The non-transitory computer readable medium of claim 1, wherein obtaining the first training media file is further based on a selection, by the first user, of the first training media file.

9. The non-transitory computer readable medium of claim 1, wherein the first training media file is associated with a mandatory training for the first user.

10. The non-transitory computer readable medium of claim 1, wherein obtaining the first training media file is further based on a search query generated by the first user.

11. The non-transitory computer readable medium of claim 1, wherein the first training media file is interactive, and wherein the mobile device is configured to support user interaction with the first training media file.

12. The non-transitory computer readable medium of claim 1, wherein the user metadata comprises at least one selected from the group consisting of a job title, an industry, a security level, a sales organization, a product focus, a job level, a client name, and a geographical location.

13. The non-transitory computer readable medium of claim 1, wherein the first training media file comprises at least one selected from the group consisting of video data, audio data, and textual data.

14. A content server for providing training media to a mobile device, configured to:
   obtain a first user metadata for a first user,
   determine the first training media file from a plurality of training media files, based on the first user metadata associated,
   communicate the first training media file to the mobile device,
   receive a training completion signal associated with the first training media file, wherein the training completion signal is generated by the mobile device based on a complete viewing of the first training media file,
   based on receiving the training completion signal:
      obtain a second user metadata for a second user, wherein the second user is associated with a first user rating for the first training media file,
      determine a second training media file from the plurality of training media files, wherein the second user is associated with a second user rating for the second training media file, and wherein the second user rating is at least as high as the first user rating, and
      suggest the second training media file to the first user.

15. The content server of claim 14, further comprising:
   a plurality of training records, wherein a training record selected from the plurality of training records is associated with the first user and the first training media file,
   wherein the content server is further configured to:
      generate the training record,
      obtain the plurality of training records, and
      analyze the plurality of training records to determine a training objective.

16. The content server of claim 14, wherein the user metadata associated with the first user, the user metadata associated with the second user, and the plurality of training media files are stored in a single data repository.

17. The content server of claim 14, wherein the mobile device comprises at least one selected from the group consisting of a mobile audio device, a mobile video device, and a mobile networking device.

18. The content server of claim 14, wherein the first training media file comprises a programmatic marker configured to indicate that the first training media file has been completely viewed.

* * * * *